(12) United States Patent
Panagotacos et al.

(10) Patent No.: US 8,083,384 B2
(45) Date of Patent: Dec. 27, 2011

(54) EFFICIENT ILLUMINATION DEVICE FOR AIRCRAFT

(75) Inventors: George W. Panagotacos, Corona, CA (US); Victor Chen, Monterey Park, CA (US)

(73) Assignee: Teledyne Technologies Incorporated, Thousand Oaks, CA (US)

( * ) Notice: Subject to any disclaimer, the term of this patent is extended or adjusted under 35 U.S.C. 154(b) by 360 days.

(21) Appl. No.: 12/364,250

(22) Filed: Feb. 2, 2009

(65) Prior Publication Data
US 2010/0195338 A1     Aug. 5, 2010

(51) Int. Cl.
*B64D 47/02* (2006.01)

(52) U.S. Cl. ... 362/471; 362/470; 362/244; 362/249.02; 362/646

(58) Field of Classification Search ............. 362/249.02, 362/249.05, 249.06, 244, 470, 471, 646, 362/650, 651, 800
See application file for complete search history.

(56) References Cited

U.S. PATENT DOCUMENTS

| | | | |
|---|---|---|---|
| 6,886,963 B2 * | 5/2005 | Lodhie | 362/249.02 |
| 7,521,872 B2 * | 4/2009 | Bruning | 362/547 |
| 7,758,223 B2 * | 7/2010 | Osawa et al. | 362/249.02 |
| 2007/0007898 A1 | 1/2007 | Bruning | |

FOREIGN PATENT DOCUMENTS

| | | |
|---|---|---|
| EP | 0107480 A2 | 5/1984 |
| EP | 0557775 A1 | 9/1993 |
| WO | WO 2008/037940 A1 | 4/2008 |

OTHER PUBLICATIONS

International Search Report mailed Mar. 29, 2010 for Application No. PCT/US2010/020032, 5 pages.
Written Opinion of the International Searching Authority for Application No. PCT/US2010/020032, 6 pages.

* cited by examiner

*Primary Examiner* — Stephen F Husar
(74) *Attorney, Agent, or Firm* — K&L Gates LLP

(57) ABSTRACT

An aircraft light source includes a first substrate having an array of electromagnetic energy emitters connected in series and configured to radiate electromagnetic energy at one or more than one predetermined wavelength. The first substrate is configured to connect to a second substrate and is configured to electrically couple to the array of electromagnetic energy emitters to an aircraft electrical power system. The aircraft light source includes a housing having a cylindrical portion and a base portion. The cylindrical portion is configured to couple to a lens and to receive the array of electromagnetic energy emitters. The base portion is adapted and configured to electrically couple to an electric socket suitable for an incandescent filament lamp in an aircraft illumination system.

23 Claims, 8 Drawing Sheets

EFFICIENT ILLUMINATION DEVICE FOR AIRCRAFT

BACKGROUND

Aircraft cockpit display panel illumination systems are designed around the output of a filament based incandescent light source (incandescent filament lamps), which is measured in mean spherical candle power (MSCP) radiating light in a spherical emission pattern. The incandescent lamps operate from standard 14 VDC or 28 VDC aircraft electrical power systems. Current aircraft cockpit panel illumination systems were designed for incandescent filament lamps, which require little or no thermal transfer.

An LED lamp is a type of solid state lighting that uses light-emitting diodes (LEDs) as the source of light, rather than electrical filaments. A typical LED, however, produces non-uniform radiation patterns primarily due to packaging constraints. Accordingly, typical LED lamps produce unsatisfactory illumination appearance. A typical miniature LED lamp incorporates only a single LED, which has a forward voltage drop of anywhere from about 2 VDC to about 3.5 VDC.

Replacing incandescent filament lamps with LED lamps in aircraft cockpit display panel illumination systems has proven challenging because of the power dissipation associated with typical LED lamps. A basic LED lamp used in an aircraft cockpit display panel illumination system requires a dropping resistor in series with the LED to offset the 14 VDC or 28 VDC aircraft electrical power operating system. The product of excess voltage dropped across the resistor and current through the resistor manifests itself as heat, which must be dissipated. Generally, the dropping resistor is formed integrally with the LED lamp assembly. For this reason, excess heat produced by the dropping resistor can eventually lead to premature failure of the LED lamp assembly. In order to increase the life and reliability of the LED lamp, the heat must be drawn away from the LED. However, as previously discussed, current aircraft cockpit panel illumination systems designed for incandescent filament lamps, which require little or no thermal transfer, do not provide adequate ventilation or cooling for drawing excess heat from the LED lamp assembly. Therefore, the heat generated in a typical LED lamp cannot escape, resulting in lower light output, decreased life expectancy, and premature failure due to higher operating temperatures.

Accordingly, there is a need for an improved efficient solid state lamp based illumination device for illuminating aircraft cockpit displays, instrument panels, avionics, switch panels, and aircraft interiors.

SUMMARY

In one embodiment an aircraft light source comprises a first substrate having a first side and a second side. An array of electromagnetic energy emitters is disposed on the first side. The electromagnetic energy emitters are connected in series and the electromagnetic energy emitters are configured to radiate electromagnetic energy at one or more than one predetermined wavelength. The second side of the first substrate is configured to connect to a second substrate. A second substrate is connected to the first substrate. The second substrate comprises a first side, a second side, a first end, and a second end. The first and second sides are configured to receive one or more electrical components. The first end is configured to electrically couple to the array of electromagnetic energy emitters and the second end is configured to electrically couple to an aircraft electrical power system. The aircraft light source comprises a housing having a cylindrical portion and a base portion. The cylindrical portion has a first end configured to couple to a lens and a second end configured to couple to an electric socket suitable for an incandescent lamp in an aircraft illumination system. The cylindrical portion defines an opening to receive the array of electromagnetic energy emitters and the first and second substrates therein. The base portion is adapted and configured to electrically couple to an electric socket suitable for an incandescent lamp in an aircraft illumination system.

FIGURES

The novel features of the various embodiments are set forth with particularity in the appended claims. The various embodiments, however, both as to organization and methods of operation, together with the advantages thereof, may be understood by reference to the following description taken in conjunction with the accompanying drawings as follows.

DESCRIPTION

Figure 1:
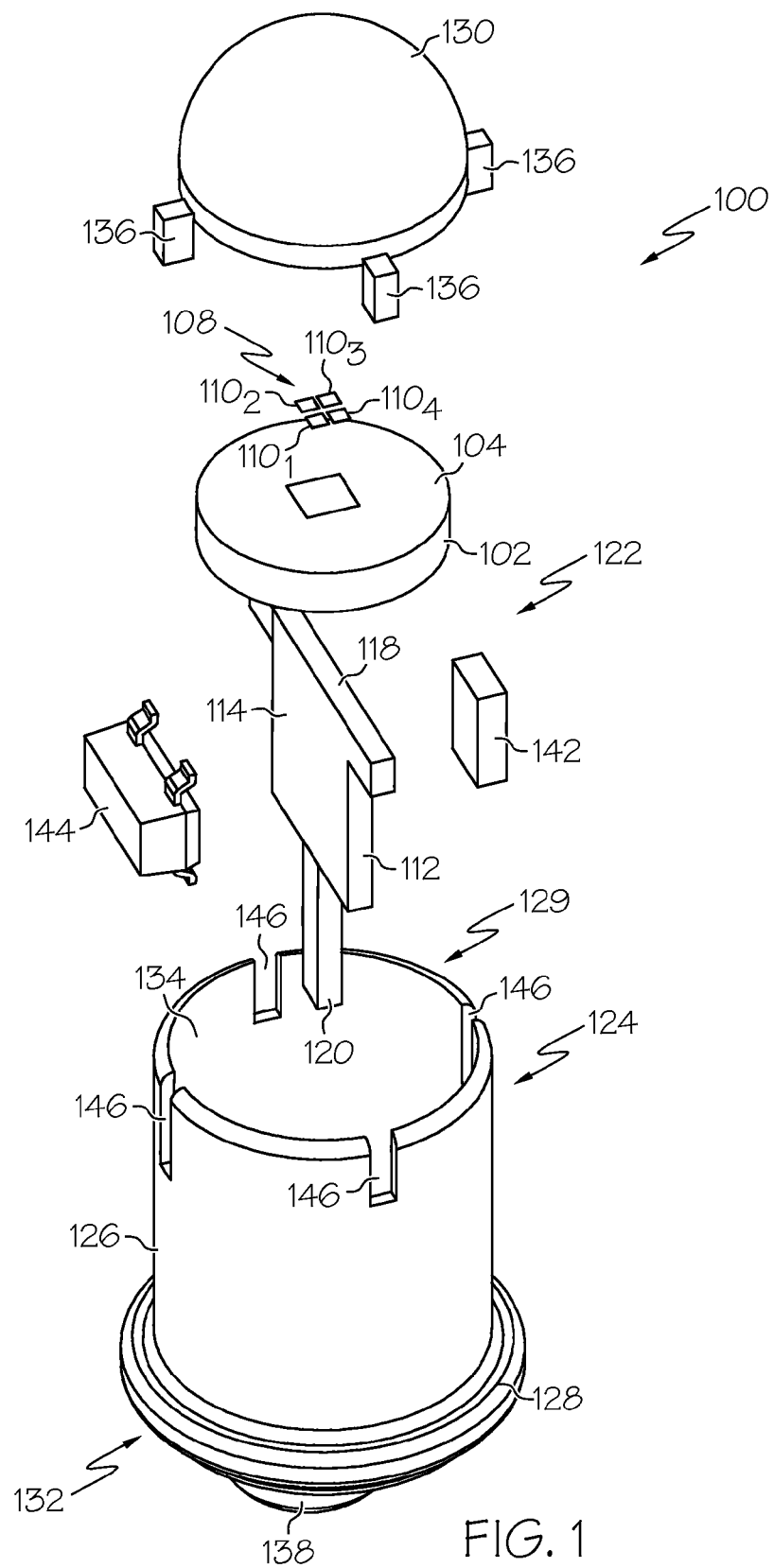
FIG. 1 is an exploded perspective view of one embodiment of a light source suitable for an aircraft cockpit display panel illumination system.

It is to be understood that the figures and descriptions described herein have been simplified to illustrate representative elements of various embodiments of efficient illumination devices comprising various embodiments of electromagnetic energy emitting elements that may be used in a variety of applications.

Various embodiments are described to provide an overall understanding of the structure, function, manufacture, and use of the devices and methods disclosed herein. One or more examples of these embodiments are illustrated in the accompanying drawings. Those of ordinary skill in the art will understand that the devices and methods specifically described herein and illustrated in the accompanying drawings are non-limiting embodiments and that the scope of the various embodiments is defined solely by the claims. The features illustrated or described in connection with one embodiment may be combined, in whole or in part, with the features of other embodiments. Such modifications and variations are intended to be included within the scope of the claims.

Although the terms first, second, and so on, may be used herein to describe various elements, components, regions, layers, and/or sections, these elements, components, regions, layers and/or sections should not be limited by these terms. These terms are only used to distinguish one element, component, region, layer, or section from another region, layer or section. Thus, a first element, component, region, layer, or section discussed below could be termed a second element, component, region, layer, or section without limiting the scope of the appended claims.

The various embodiments described herein with reference to the illustrations may be shown as idealized schematic illustrations. As such, variations from the shapes of the illustrations as a result, for example, of manufacturing techniques and/or tolerances are expected. The various embodiments, however, should not be construed as limited to the particular shapes of the regions illustrated herein but are to include deviations in shapes that result, for example, from manufacturing. A region illustrated or described as square or rectangular will typically have rounded or curved features due to normal manufacturing tolerances. Thus, the regions illustrated in the figures are schematic in nature and their shapes are not intended to illustrate the precise shape of a region of a device and are not intended to limit the scope of the appended claims.

FIGS. 1-6 illustrate one embodiment of a light source 100 suitable for an aircraft cockpit display panel illumination system. The light source 100 comprises a first substrate 102 having a first side 104 and a second side 106. An array 108 of electromagnetic energy emitters $110_{1-n}$, where n is any positive integer, is disposed on the first side 104 of the first substrate 102 in any predetermined arrangement. In the illustrated embodiment, the array 108 comprises four electromagnetic energy emitters $110_{1-4}$ connected in series. The electromagnetic energy emitters $110_{1-4}$ are configured to radiate electromagnetic energy at one or more than one predetermined wavelength. In one embodiment, each one of the electromagnetic energy emitters $110_{1-4}$ is configured to radiate electromagnetic energy at a different wavelength or at one or more than one wavelength. In one embodiment, at least one of the electromagnetic energy emitters $110_{1-4}$ comprises at least one light emitting element such as one or more than one LED, for example. Elements of the electromagnetic energy emitters $110_{1-4}$ are electrically interconnected by a network of electrical conductors and are coupled to aircraft electrical power system 200 (FIG. 7) to energize the electromagnetic energy emitters $110_{1-4}$. When the electromagnetic energy emitters $110_{1-4}$ are energized by the aircraft electrical power system 200, the light source 100 produces a specific spectral output, which is suitable for aircraft cockpit display panel illumination systems designed around the output of an incandescent filament lamp. The specific spectral output may be suitable for use in existing incandescent filament lamp systems to illuminate aircraft cockpit displays, instrument panels, avionics, switch panels, and aircraft interiors. Electrical connections to the electromagnetic energy emitters $110_{1-4}$ may be made through conventional electrical contacts.

Figure 7:
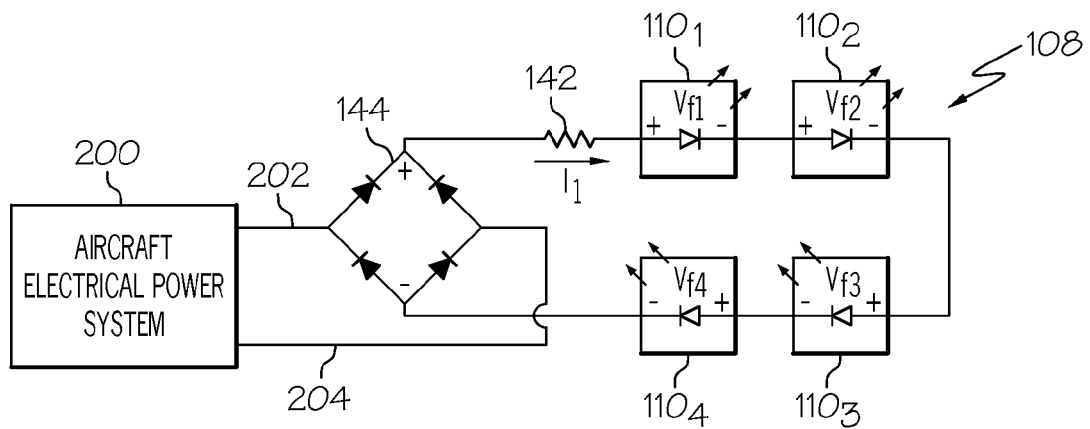
FIG. 7 is a schematic view of one embodiment of the light emitting element of the light source shown in FIG. 1 coupled to an aircraft electrical power system.

In the illustrated embodiment, four electromagnetic energy emitters $110_{1-4}$ are arranged in one array. In one embodiment, each of the four electromagnetic energy emitters $110_{1-4}$ may be configured to radiate electromagnetic radiation at the same wavelength or at different wavelengths when energized by an electrical power source, such as an aircraft electrical power system 200 (FIG. 7). Each of the electromagnetic energy emitters $110_{1-4}$ may comprise LEDs, vertical cavity surface emitting lasers (VCSELs), or other semiconductor devices configured to radiate electromagnetic energy at one or more than one predetermined wavelength. In one embodiment the electromagnetic energy emitters $110_{1-4}$ may comprise one or more LEDs configured to emit light at predetermined visible wavelengths. Each of the electromagnetic energy emitters $110_{1-4}$ may comprise one or more LEDs. In the illustrated embodiment, each of the electromagnetic energy emitters $110_{1-4}$ comprises a corresponding LED. In one embodiment, the first and second electromagnetic energy emitters $110_1$, $110_2$ may be configured to radiate the red light in the wavelength range of about 620 nm to about 750 nm and the third and fourth electromagnetic energy emitters $110_3$, $110_4$ may be configured to radiate blue light in the wavelength range of about 450 nm to about 495 nm. In other embodiments, the electromagnetic energy emitters $110_{1-4}$ may be configured to radiate light at any suitable wavelength.

In one embodiment, the light source 100 may be configured to radiate light at a single monochromatic wavelength. It will be appreciated by those skilled in the art that the light source 100 may comprise one or more light emitting elements that, when energized by an electrical power source, such as an aircraft electrical power system 200 (FIG. 7), may be configured to radiate electromagnetic energy in the visible spectrum as well as the invisible spectrum. The visible spectrum, sometimes referred to as the optical spectrum or luminous spectrum, is that portion of the electromagnetic spectrum that is visible to (e.g., can be detected by) the human eye and may referred to as visible light or simply light. A typical human eye will respond to wavelengths in air from about 380 nm to about 750 nm. The visible spectrum is continuous and without clear boundaries between one color and the next. The following ranges may be used as an approximation of color wavelength:

Violet: about 380 nm to about 450 nm;
Blue: about 450 nm to about 495 nm;
Green: about 495 nm to about 570 nm;
Yellow: about 570 nm to about 590 nm;
Orange: about 590 nm to about 620 nm; and
Red: about 620 nm to about 750 nm.

The invisible spectrum (i.e., non-luminous spectrum) is that portion of the electromagnetic spectrum lies below and above the visible spectrum (e.g., below about 380 nm and above about 750 nm). The invisible spectrum is not detectable by the human eye. Wavelengths greater than about 750 nm are longer than the red visible spectrum and they become invisible infrared, microwave, and radio electromagnetic radiation. Wavelengths less than about 380 nm are shorter than the violet spectrum and they become invisible ultra-violet, x-ray, and gamma ray electromagnetic radiation.

In one embodiment, multiple light sources 100 configured to radiate light in the visible spectrum may be disposed in a predetermined array or arrangement. When the light sources 100 are energized by the aircraft electrical power system 200 (FIG. 7), the light sources 100 produce a specific uniform predetermined spectral output suitable for use in existing incandescent filament lamp systems for illuminating aircraft cockpit displays, instrument panels, avionics, switch panels, and aircraft interiors.

In the illustrated embodiment, the light source 100 comprises a second substrate 112, which comprises a first side 114, a second side 116, a first end 118, and a second end 120. The first and second sides 114, 116 are configured to receive one or more electrical components 122. In one embodiment, the first end 118 of the second substrate 112 is connected to the second side 106 of the first substrate 102. In the illustrated embodiment, the second substrate 112 is connected substantially perpendicularly to the first substrate 102. The first end 118 is configured to electrically couple to the array 108 of the electromagnetic energy emitters $110_{1-4}$. The second end 120 is configured to electrically couple to the aircraft electrical power system 200 (FIG. 7). A resistor 142 is disposed on the second substrate 112 and is coupled in series to the array 108 of the electromagnetic energy emitters 110. A rectifier 144 is disposed on the second substrate 112 to convert alternating current received from the aircraft electrical power system 200 to direct current suitable for powering the array 108 of the electromagnetic energy emitters 110. In one embodiment, the second substrate 112 may be T-shaped.

In one embodiment, the first and second substrate 102, 112 may be formed in any suitable shape or size and configured to be removably or fixedly attached to a housing 124. In one embodiment, the first and second substrate 102, 112 may be formed as a unitary substrate. The first and second substrate 102, 112 can be made of many different structures and materials such as a printed circuit board (PCB), standard FR-4 PCB, ceramic, a metal core printed circuit board (MCPCB), or any other suitable type of printed circuit board materials. Other suitable materials include, without limitation, ceramic materials such as aluminum oxide, aluminum nitride or organic insulators like polyimide (PI), and polyphthalamide (PPA) laminated with thermally and electrically conductive materials such as copper or other similar materials. In other embodiments, the first and second substrate 102, 112 may comprise sapphire or silicon, or any other suitable material, such as T-Clad thermal clad insulated substrate material, available from The Bergquist Company of Chanhassen, Minn.

Figure 2:
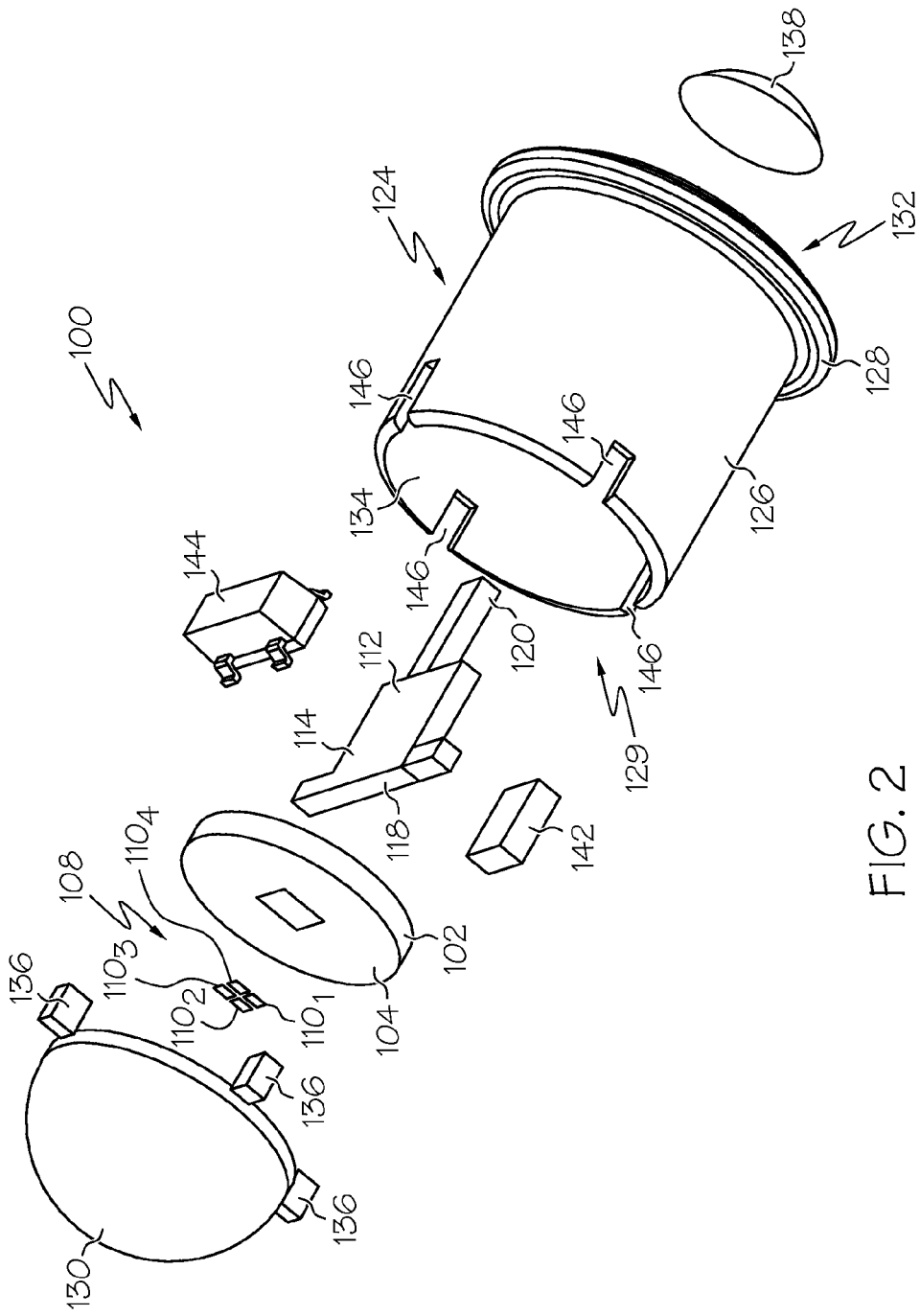
FIG. 2 is an exploded perspective view of one embodiment of the light source shown in FIG. 1.
Figure 8:
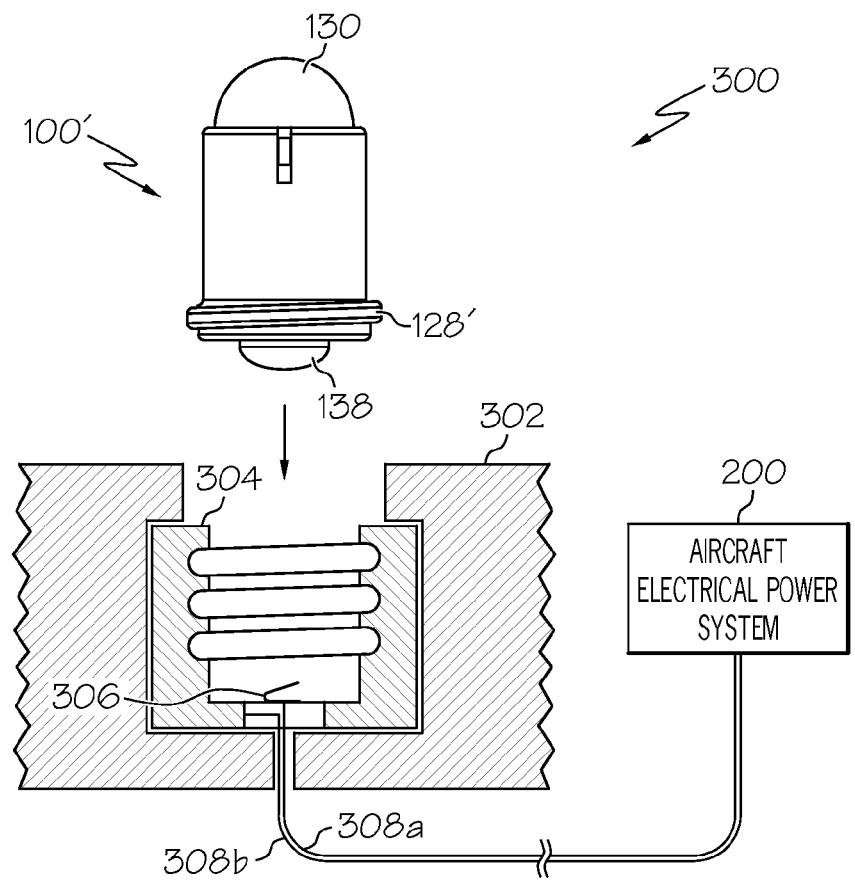
FIG. 8 illustrates a cross-sectional view of an aircraft cockpit display system configured to receive embodiment of a light source.

The housing 124 has a cylindrical portion 126 and a base 128 portion. The cylindrical portion 126 has a first end 129 configured to couple to a lens 130 (e.g., ball lens, lens cap, optical cap) and a second end 132 configured to couple to an electric socket suitable for an incandescent lamp in an avionics cockpit display system. As best seen in FIGS. 1 and 2, the cylindrical portion 126 defines an opening 134 to receive the array 108 of the electromagnetic energy emitters 110 and the first and second substrates 102, 112, therein. The base 128 is adapted and configured to electrically couple to an electric socket suitable for an incandescent filament lamp for illuminating an aircraft cockpit display, instrument panel, avionics, switch panels, and aircraft interiors, for example. In one embodiment, the base 128 acts as the electrical return terminal. An electrical contact 138 is formed on the base 128 of the housing 124. The electrical contact 138 is the power receiving portion of the light source 100. The base 128 and the electrical contact 138 portion are adapted to couple to the aircraft electrical power system 200 (FIGS. 7 and 8). In one embodiment, the base (e.g., base 128' as described with reference to FIG. 8 below) may be a male-threaded metal base portion suitable to be received in a corresponding female-threaded metal socket portion. In other embodiments, the base 128 may provide an electrical contact surface for coupling to an aircraft cockpit display, instrument panel, avionics, switch panels, and aircraft interiors, for example, as described with reference to FIGS. 9 and 10 below.

Figure 3:
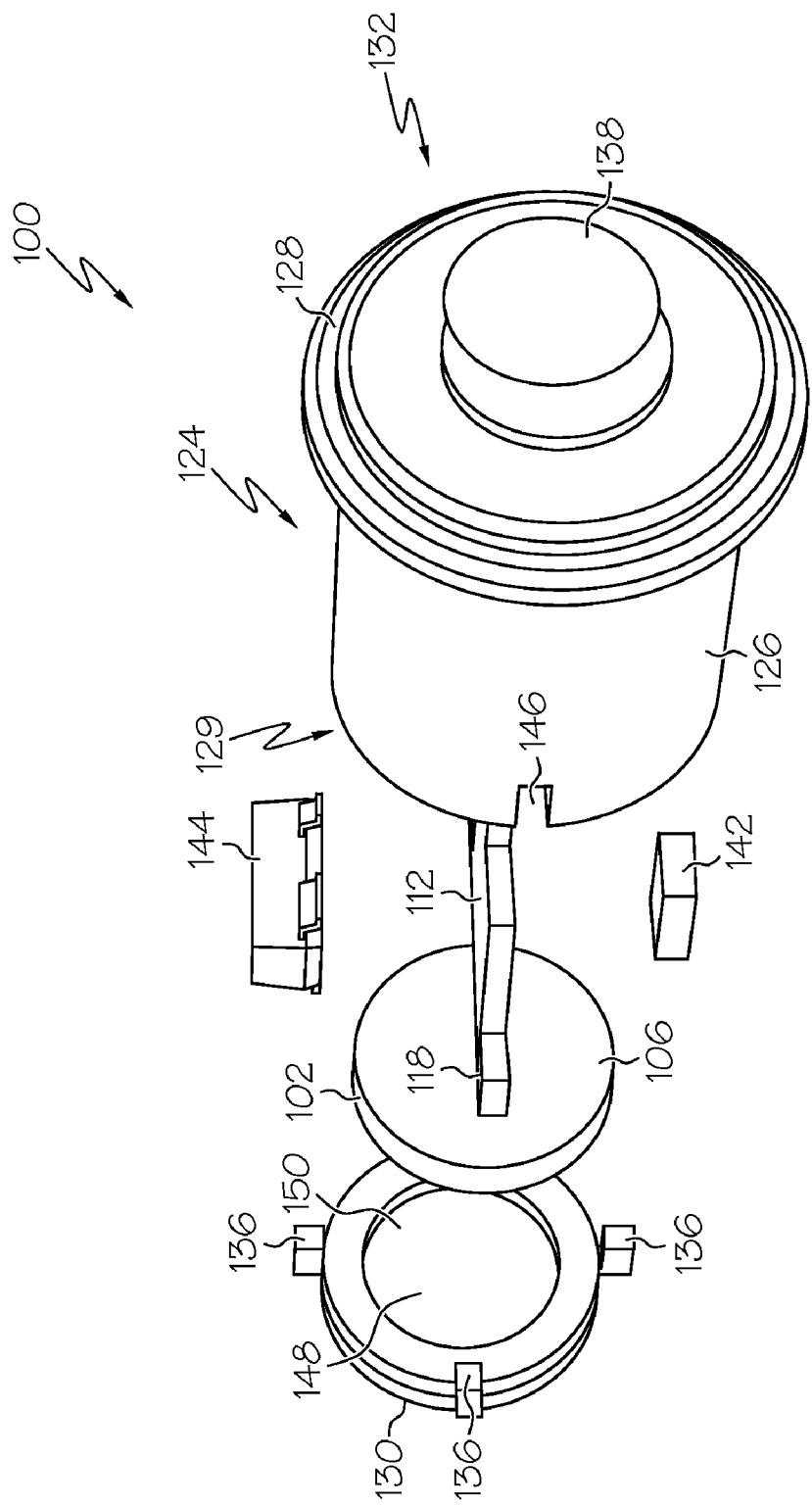
FIG. 3 is an exploded perspective view of one embodiment of the light source shown in FIG. 1.
Figure 4:
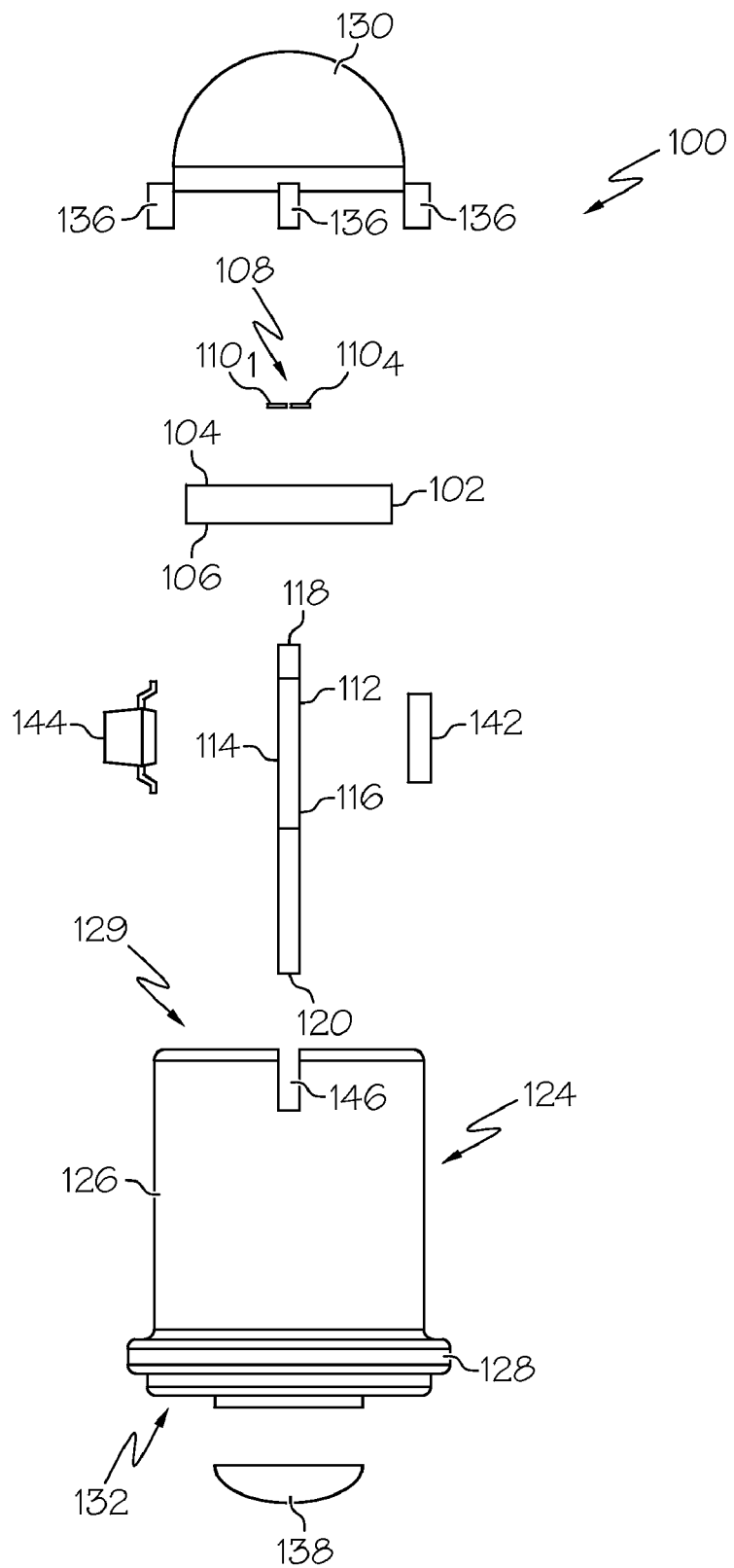
FIG. 4 is an exploded side view of one embodiment of the light source shown in FIG. 1.
Figure 5:
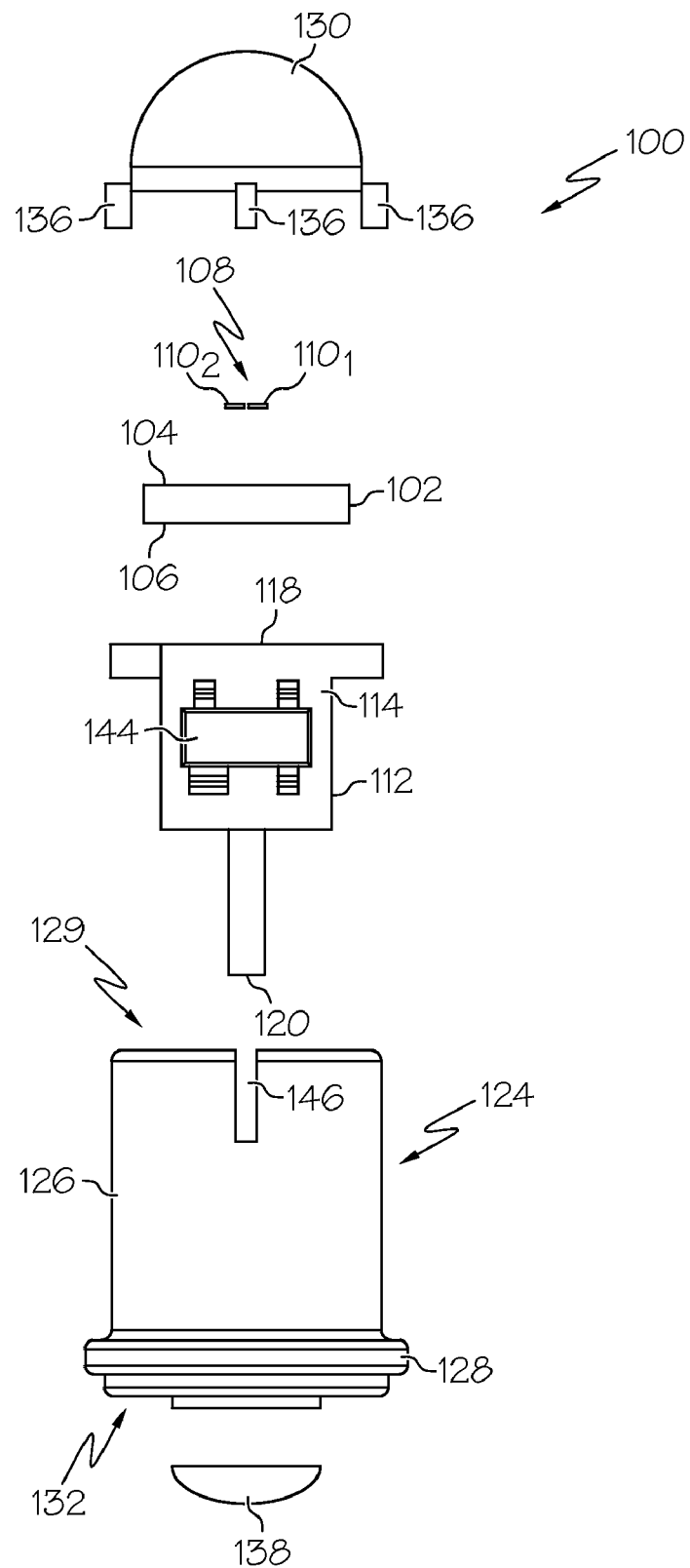
FIG. 5 is an exploded side view of one embodiment of the light source shown in FIG. 1.
Figure 6:
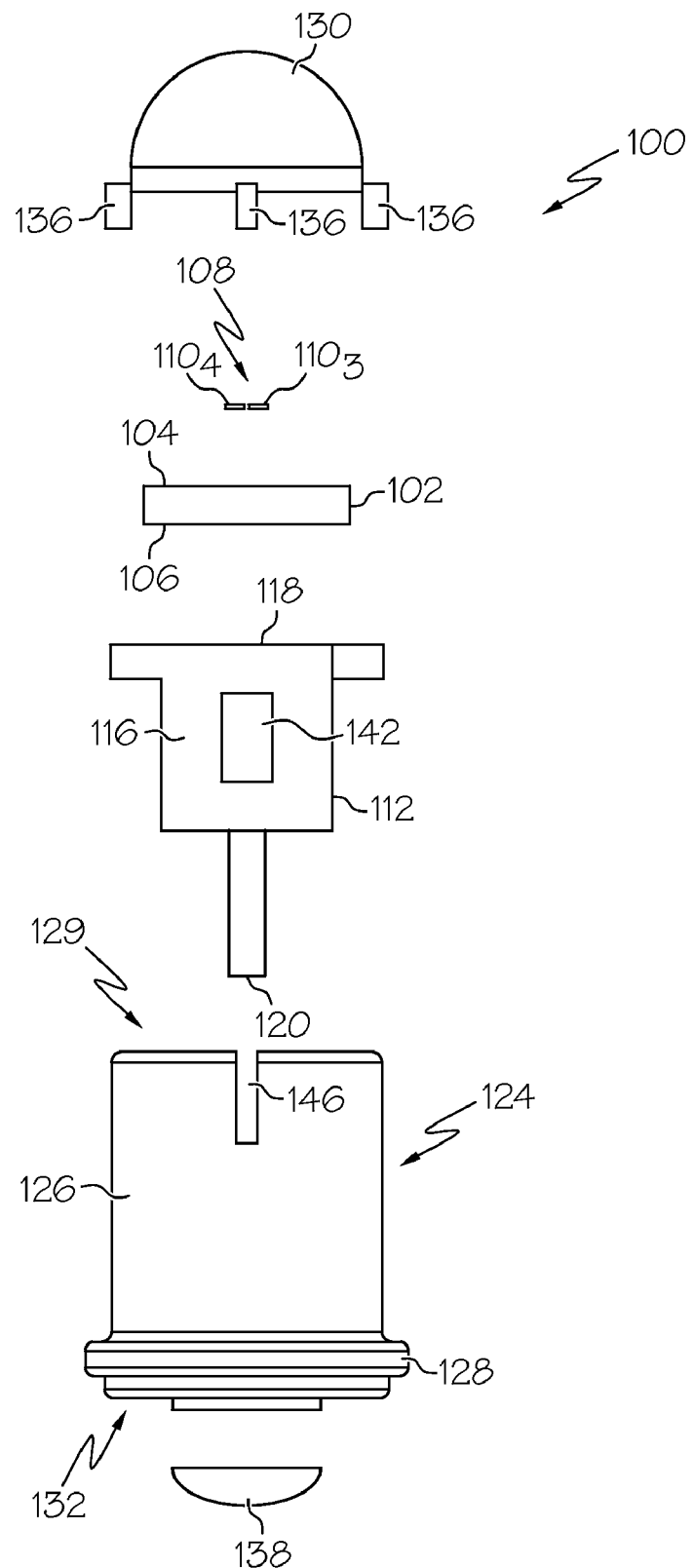
FIG. 6 is an exploded side view of one embodiment of the light source shown in FIG. 1.

In one embodiment, the lens 130 may be produced from acrylic or any other suitable optically transmissive plastic. The lens 130 may be configured to couple to the first end 129 of the cylindrical portion 126 of the housing 124. In one embodiment, the lens 130 comprises a plurality of projecting members 136 and the first end 129 of the cylindrical portion 126 of the housing 124 comprises a plurality of slots 146 to receive the respective projecting members 136. In one embodiment, the lens 130 may be coated, injected molded, or impregnated with one or more phosphors to absorb at least some of the energy emitted by the electromagnetic energy emitters $110_{1-4}$. In one embodiment, the energy output through the lens 130 is a combination of energy emitted by the electromagnetic energy emitters 110 and phosphor light. The lens 130 can be coated using many different methods such as, for example, electrophoretic deposition (EPD). In one embodiment, a mixture of phosphor and silicone can be introduced (e.g., potted) into the opening 148 defined by the concave portion 150 of the lens cap 130, as best seen in FIG. 3.

The light source 100 can be used as an efficient drop-in replacement for conventional miniature incandescent filament lamps for illuminating aircraft cockpit displays, instrument panels, avionics, switch panels, and aircraft interiors. Typical incandescent filament lamps used in aircraft applications operate from standard 14 VDC or 28 VDC aircraft electrical power systems. As previously discussed, replacing the incandescent filament lamp with an LED lamp comprising a single LED is not efficient because of the excess heat that must be dissipated by the LED lamp assembly. For example, a single blue wavelength LED has a typical forward bias voltage of about 3.5 VDC. To achieve sufficient radiant power, the blue wavelength LED should be driven at a current $I_1$ of about 30 mA. Therefore, in a 28 VDC aircraft electrical power system, the current limiting resistor 142 connected in series with the blue wavelength LED will drop 24.5 VDC. At 30 mA of drive current, the power dissipated by the current limiting resistor 142 is about 735 mW:

24.5 VDC=28 VDC−3.5 VDC 735 mW=24.5 VDC*30 mA

FIG. 7 is a schematic diagram showing the four LED $110_{1-4}$ array 108 portion of the light source 100 coupled to an aircraft electrical power system 200. In one embodiment, the aircraft electrical power system 200 may be configured to supply a direct current (DC) or an alternating current (AC) at output terminals 202, 204. The rectifier 144 may be connected to the output terminals 202, 204 to supply DC voltage to the four LED $110_{1-4}$ array 108 regardless of whether the aircraft electrical power system 200 is a DC or AC source. Thus, the rectifier 144 can be connected between the aircraft electrical power system 200 and the four LED $110_{1-4}$ array 108 to supply a DC voltage suitable for operating the light source 100. It will be appreciated that the aircraft electrical power system 200 is representative of one of many ways to supply electrical power to the light source 100. For example, in some embodiments, the aircraft electrical power system 200 may be coupled to a bank of batteries. In one embodiment, the LEDs $110_{1-4}$ may be interconnected and arranged in one or more arrays. As shown, the four LEDs $110_{1-4}$ are connected in series and are connected in series with the current limiting resistor 142. As shown in FIG. 7, the array 108 is coupled to a 28 VDC aircraft electrical power system 200. For an array 108 comprising four LEDs $110_{1-4}$ connected in series, the forward bias voltage drop $Vf_{1-4}$ across each LED $110_{1-4}$ is about 3.5 VDC, thus the total bias voltage drop across all four LEDs $110_{1-4}$ is about 14 VDC, or the sum of the bias voltage drops $Vf_{1-4}$ for each LED $110_{1-4}$. In the embodiment illustrated in FIG. 7, 10 mA of drive current through each LED $110_{1-4}$ is sufficient to achieve a suitable radiant power output. Accordingly, the power dissipated by the series connected current limiting resistor 142 is now only 140 mW:

140 mW=14 VDC*10 mA

Thus, the array 108 of series connected LEDs $110_{1-4}$ produces sufficient radiant power while consuming much less electrical power and, as a result, dissipating much less heat. Because conventional incandescent filament lamps assemblies in aircraft cockpit displays, instrument panels, avionics, switch panels, and aircraft interiors generally are not thermally conductive, the array 108 provides a suitable efficient light source 100 for avionic cockpit displays, instrument panels, switch panels, and aircraft interiors. In various other embodiments, the array 108 can be scalable to an N×M array (where N and M are any positive integers) of electromagnetic energy emitters (e.g., LEDs). The number of electromagnetic energy emitters in the array may be limited by the available power supply, e.g., 28 VDC for the aircraft electrical power system 200.

Those skilled in the art will appreciate that the LEDs $110_{1-4}$ used in the light source 100 are highly efficient semiconductor photon sources that can radiate light in the visible as well as the invisible spectrum. They are typically forward-biased p-n junctions fabricated from a semiconductor material that emits light via injection electroluminescence. The small size, high efficiency, high reliability, and compatibility with electronic systems make the LEDs $110_{1-4}$ very useful for the aircraft light source 100 application. Any suitable combination of LEDs may be employed. For example, any combination of LEDs that can radiate visible light in a range of colors or LEDs that can radiate infrared and ultraviolet light may be employed in the light source 100.

In various embodiments, the light source 100 may comprise multiple LEDs arranged in various configurations or arrays to achieve luminous outputs at various wavelengths. Various spectral responses may be produced based on the intensity of the light emitted by the individual LED $110_{1-4}$ elements. The LEDs $110_{1-4}$ are laid out on a surface of the first side 104 of the first substrate 102 in the array 108. The array 108 may take nearly any shape. The necessary electrical connections to power the LED $110_{1-4}$ array 108 are provided to input and output connections, which also may be located on the first side 104 of the fist substrate 102. The LED $110_{1-4}$ array 108 can be arranged and interconnected in various ways. The LED $110_{1-4}$ array 108 can be soldered, wire-bonded, epoxied, or can be interconnected using a connector, for example.

The light source 100 may comprise many different types of solid state electromagnetic energy emitters $110_{1-n}$, even though the embodiments have been described in relation to LEDs, provided that the solid state electromagnetic energy emitters $110_{1-n}$ emit light at a wavelength suitable for use in existing incandescent filament lamps to illuminate aircraft cockpit displays, instrument panels, avionics, switch panels, and aircraft interiors. It is also to be understood that different colors of LEDs can be used in a single array with a suitable mixer to generate the desired output color of light. For example, red emitting LEDs can be combined with green and blue emitting LEDs so that the array emits white light. The embodiments discussed herein may be employed in many different aircraft lighting applications and the discussion of the embodiments herein should not be construed as limiting to a particular embodiment or similar embodiments. For example, in one embodiment, the optical design and color temperature formulation of the light source 100 may be selected to produce light emissions that mimic incandescent filament lamp performance. Accordingly, in one embodiment, the housing 124 may be selected to enable the light source 100 to be used as a drop-in replacement for an incandescent filament lamp. In one embodiment, the electromagnetic energy source comprises a high efficiency LED lamp assembly to replace the incandescent filament based (white light) lamps in aircraft illumination and indication applications.

The structures of the LEDs $110_{1-4}$ and their fabrication and operation are generally known in the art and are only briefly discussed herein. The LED $110_{1-4}$ layers can be fabricated using known processes with a suitable process being fabrication using metal organic chemical vapor deposition (MOCVD). The LED $110_{1-4}$ layers generally comprise an active layer/region sandwiched between first and second oppositely doped epitaxial layers all of which are formed successively on a growth substrate. The LEDs $110_{1-4}$ can be formed on a wafer and then singulated for mounting on the substrate 102. It is understood that the growth substrate can remain as part of the final singulated LED $110_{1-4}$ or the growth substrate can be fully or partially removed.

It is also understood that additional layers and elements can also be included in the LEDs $110_{1-4}$, including, without limitation, a buffer, a nucleation, a contact, and current spreading layers as well as light extraction layers and elements. The active region can comprise single quantum well (SQW), multiple quantum well (MQW), double heterostructure, or super lattice structures. The active region and doped layers may be fabricated from different material systems, with preferred material systems being Group-III nitride based material systems. Group-III nitrides refer to those semiconductor compounds formed between nitrogen and the elements in the Group III of the periodic table, usually aluminum (Al), gallium (Ga), and indium (In). The term also refers to ternary and quaternary compounds such as aluminum gallium nitride (AlGaN) and aluminum indium gallium nitride (AlInGaN). In one embodiment, the doped layers are gallium nitride (GaN) and the active region is InGaN. In other embodiments, the doped layers may be AlGaN, aluminum gallium arsenide (AlGaAs) or aluminum gallium indium arsenide phosphide (AlGaInAsP).

The growth substrate can be made of many materials such at sapphire, silicon carbide, aluminum nitride (AlN), GaN, with a suitable substrate being a 4H polytype of silicon carbide, although other silicon carbide polytypes can also be used including 3C, 6H and 15R polytypes. Silicon carbide has certain advantages, such as a closer crystal lattice match to Group III nitrides than sapphire and results in Group III nitride films of higher quality. Silicon carbide also has a very high thermal conductivity so that the total output power of Group-III nitride devices on silicon carbide are typically not limited by the thermal dissipation of the substrate 102 (as may be the case with some devices formed on sapphire). SiC substrates are available from Cree Research, Inc., of Durham, N.C. and methods for producing them are set forth in the scientific literature as well as in a U.S. Pat. Nos. Re. 34,861; 4,946,547; and 5,200,022.

The LEDs $110_{1-4}$ also may comprise a conductive current spreading structure and the one or more wire bond pads on their top surface, both of which are made of a conductive material and can be deposited using known methods. Some materials that can be used for these elements include Au, Cu, Ni, In, Al, Ag or combinations thereof and conducting oxides and transparent conducting oxides. The current spreading structure generally comprises conductive fingers arranged in a grid on the LEDs $110_{1-4}$ with the fingers spaced to enhance current spreading from the pads into the top surface of the LEDs $110_{1-4}$. In operation, an electrical signal may be applied to the bond pads through wire bonds and the electrical signal spreads through the fingers of the current spreading structure and the top surface into the LEDs $110_{1-4}$. Current spreading structures are often used in LEDs where the top surface is p-type, but can also be used for n-type materials.

The LEDs $110_{1-4}$ may be coated with one or more phosphors with the phosphors absorbing at least some of the LED $110_{1-4}$ light and emitting a different wavelength of light such that the light source 100 emits a combination of light from the LED $110_{1-4}$ and the phosphor. In one embodiment, the LED $110_{1-4}$ emits a combination of LED and phosphor light. The LEDs $110_{1-4}$ can be coated using many different methods. Alternatively, the LEDs $110_{1-4}$ can be coated using other methods such as the previously discussed EPD method. It is understood that one LED may comprise multiple LEDs of different colors, one or more of which may be white emitting.

In one embodiment of the light source 100, an encapsulant may be formed over the LEDs $110_{1-4}$ by molding over each of the LEDs $110_{1-4}$ and many different molding methods can be used. In one embodiment a molding process may be used to simultaneously form lenses over the LEDs $110_{1-4}$. In one embodiment, a suitable encapsulant material may be liquid curable silicone. The liquid silicone can be poured over the LEDs $110_{1-4}$ and can then be cured using known curing processes.

FIG. 8 illustrates a cross-sectional view of an aircraft cockpit display system 300 configured to receive one embodiment of an aircraft light source 100'. The internal components of the light source 100' were previously discussed in FIGS. 1-7 with the exception being that base 128' is threaded. The aircraft cockpit display system 300 comprises a panel 302. The panel 302 is representative of aircraft cockpit displays, instrument panels, avionics, switch panels, and aircraft interiors illuminated by light sources. A metal electric socket 304 disposed within the panel 302 and is adapted and configured to receive conventional miniature incandescent filament lamps to illuminate the panel 302, e.g., aircraft cockpit displays, instrument panels, avionics, switch panels, aircraft interiors. As previously discussed with respect to the light source 100, the light source 100' is configured as an efficient drop-in replacement for conventional miniature incandescent filament lamps to illuminate the panel 302. Accordingly, the male-threaded base 128' of the light source 100' is configured to be received within the female-threaded socket 304, which is the electrical return terminal. The electrical contact 138, the power receiving portion of the light source 100', is configured to couple to a metal contact spring 306, which is the power receiving input terminal. The electric socket 304 and the contact spring 306 are coupled to the aircraft electrical power system 200 through electrical conductors 308a and 308b. The base128' of the light source 100' may be configured in any suitable manner to match particular aircraft cockpit display systems. Other configurations, such as snap-in or twist-in light source-to-socket coupling techniques are within the scope of this specification. Accordingly, the embodiments are not limited in this context.

As previously discussed with respect to the light source 100, the light source 100' comprises an array 108 of electromagnetic energy emitters $110_{1-n}$ and produces a uniform radiation pattern suitable for replacement of conventional incandescent filament based lamps. In addition, the power dissipation of the array 108 of electromagnetic energy emitters $110_{1-n}$ is low such that excess heat is not produced within the socket 304 and/or the panel 302 and does not require ventilation or cooling for drawing excess heat away form the light source 100'. In addition, the light source 100' may be coupled to the aircraft electrical power system 200. Accordingly, the light source 100' is a suitable drop-in replacement for conventional incandescent filament based lamps in aircraft panel 302 systems and does not suffer for the power dissipation limitations of conventional single LED replacement lamps.

Figure 9:
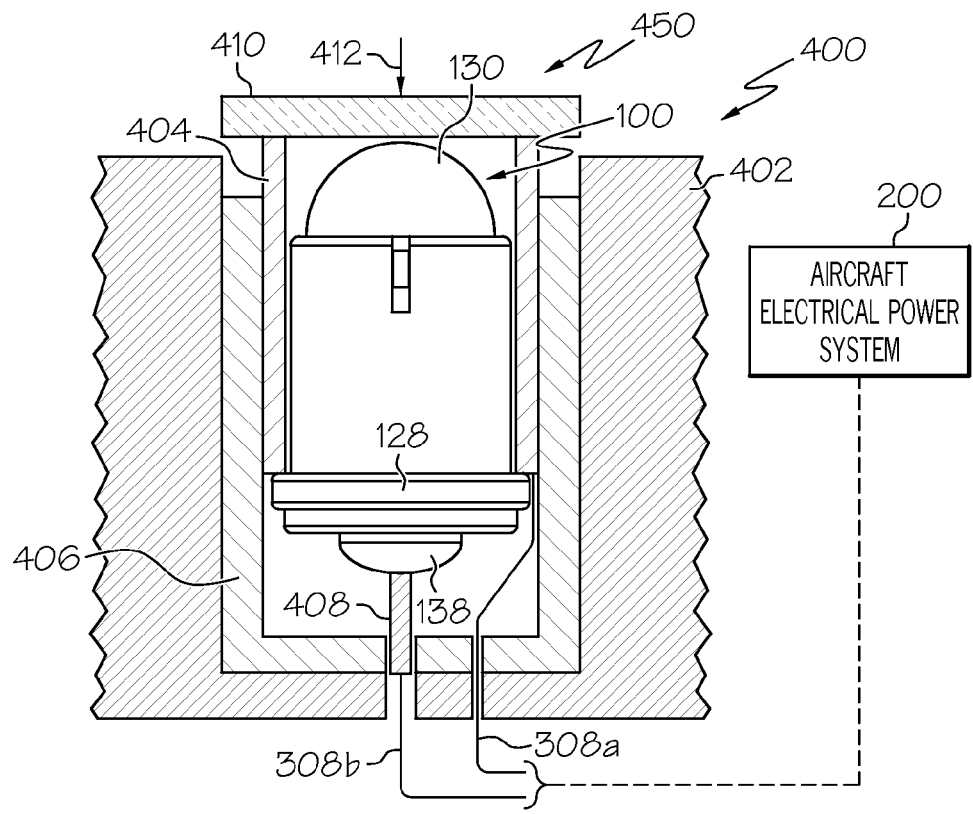
FIG. 9 illustrates a partial cross-sectional view of an aircraft cockpit display system configured to receive one embodiment of an aircraft light source assembly shown in a first position.
Figure 10:
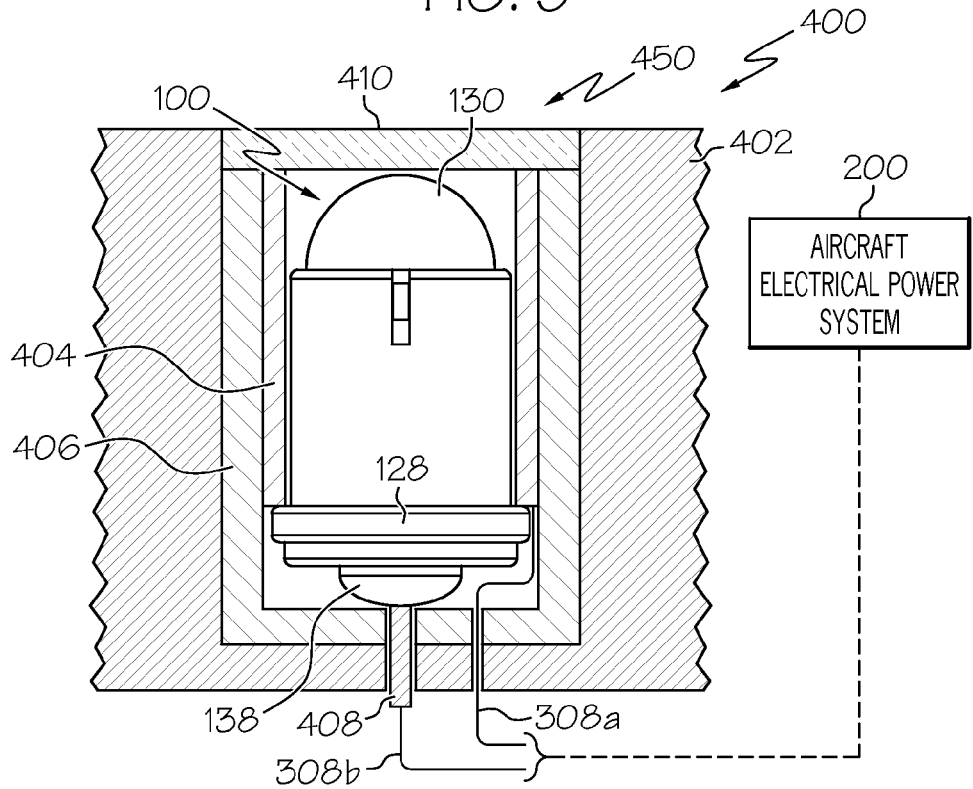
FIG. 10 illustrates a partial cross-sectional view of the aircraft cockpit display system shown in FIG. 9 with one embodiment of the light source assembly shown in a second snapped-in position.

FIGS. 9 and 10 illustrates a partial cross-sectional view of an aircraft cockpit display system 400 configured to receive one embodiment of an aircraft light source assembly 450. FIG. 9 illustrates the aircraft cockpit display system 400 with the one embodiment of the light source assembly 450 shown in a first position. FIG. 10 illustrates the aircraft cockpit display system 400 with one embodiment of the light source assembly 450 shown in a second snapped-in position. The light source assembly 450 is movable between the first position and the second position by applying a pushing force 412 against an outer surface of an optically transparent member 410 of the light source assembly 450. The light source assembly 450 comprises the light source 100, previously discussed in FIGS. 1-7, a sleeve 404, a housing 406, a plunger switch mechanism 408, and the optically transparent member 410. The aircraft cockpit display system 400 comprises a panel 402 configured to house the aircraft light source assembly 450. The panel 402 is representative of aircraft cockpit displays, instrument panels, avionics, switch panels, and aircraft interiors illuminated by light sources.

The electrically insulative housing 406 is disposed within the panel 402 and is adapted and configured to receive conventional miniature incandescent filament lamps to illuminate the panel 402, e.g., aircraft cockpit displays, instrument panels, avionics, switch panels, aircraft interiors. In the embodiment illustrated in FIGS. 9 and 10, light generated by the array 108 of electromagnetic energy emitters $110_{1-n}$ (shown in FIGS. 1, 2, and 4-7) exits the lens 130 portion of the light source 100 and is transmitted through the optically transparent member 410. The sleeve 404 is slidably disposed within the housing 406 and is adapted and configured to receive the light source 100 in an opening defined therein. The sleeve 404 is attached to the optically transparent member 410.

As previously discussed, the light source 100 is configured as an efficient drop-in replacement for conventional miniature incandescent filament lamps to illuminate the panel 402. The plunger switch mechanism 408 is slidably disposed within the housing 406. The plunger switch mechanism 408 is spring loaded and engages the electrical contact 138, which is the power receiving portion of the light source 100. The sleeve 404 and the optically transparent member 410 form a lighted push-button assembly. Thus, the plunger switch mechanism 408 can be actuated and deactuated by applying the pushing force 412 against the optically transparent member 410.

The light source 100 is coupled to the aircraft electrical power system 200 through electrical conductors 308a and 308b. The base 128 of the light source 100 is configured to contact electrically conductive surfaces of the sleeve 404 and forms the electrical return terminal. The plunger switch mechanism 408 is coupled to the electrical contact 138 and the aircraft electrical power system 200 through the electrical conductor 308b. The base 128 is coupled to the aircraft electrical power system 200 through the electrical conductor 308a.

Those of ordinary skill in the art will recognize that many modifications and variations of the embodiments discussed herein may be implemented. Also, where materials are disclosed for certain components, other materials may be used. The foregoing description and following claims are intended to cover all such modification and variations.

The invention claimed is:

1. An aircraft light source, comprising:
a first substrate having a first side and a second side;
an array of electromagnetic energy emitters being connected in series, the array comprising at least a first and a second electromagnetic energy emitters, the first and second electromagnetic energy emitters comprising a cathode and an anode, wherein the anode of the first electromagnetic energy emitter is configured to couple to an aircraft electrical power system, wherein the cathode of the first electromagnetic energy emitter is configured to couple to the anode of the second electromagnetic energy emitter, wherein each of the at least first and second electromagnetic energy emitters have a specified forward bias voltage drop, wherein a sum of the forward bias voltage drops reduces a current drawn by the array to produce a specific uniform predetermined spectral output and a thermal signature substantially similar to an incandescent lamp in an aircraft illumination system, wherein the light source is a direct drop-in replacement for the incandescent lamp, and wherein the light source requires substantially no thermal transfer, the electromagnetic energy emitters configured to radiate electromagnetic energy at one or more than one predetermined wavelengths, the second side of the first substrate configure to connect to a second substrate;
a second substrate connected to the first substrate, the second substrate comprising a first side, a second side, a first end, a second end, the first and second sides are configured to receive one or more electrical components, the first end is configured to electrically couple to the array of electromagnetic energy emitters and the second end is configured to electrically couple to an aircraft electrical power system; and
a housing having a cylindrical portion and a base portion, the cylindrical portion having a first end configured to couple to a lens and a second end configured to couple to an electric socket suitable for the incandescent lamp in the aircraft illumination system, the cylindrical portion defining an opening to receive the array of electromagnetic energy emitters and the first and second substrates therein, the base being adapted and configured to electrically couple to an electric socket suitable for the incandescent lamp in the aircraft illumination system.

2. The aircraft light source of claim 1, wherein the first and second substrates are connected perpendicularly relative to each other.

3. The aircraft light source of claim 1, comprising a lens configured to couple to the first end of the cylindrical portion of the housing.

4. The aircraft light source of claim 3, wherein the lens comprises a plurality of projecting members and wherein the first end of the cylindrical portion of the housing comprises a plurality of slots to receive the respective projecting members.

5. The aircraft light source of claim 3, wherein the lens comprises one or more phosphors to absorb at least some of the energy emitted by the electromagnetic energy emitters.

6. The aircraft light source of claim 1, comprising an electrical contact formed on the base portion of the housing adapted to couple to the aircraft electrical power system.

7. The aircraft light source of claim 1, wherein each of the electromagnetic energy emitters are configured to radiate electromagnetic energy at a different wavelength.

8. The aircraft light source of claim 1, wherein at least one of the electromagnetic energy emitters comprises at least one light emitting element.

9. The aircraft light source of claim 8, wherein the at least one light emitting element comprises a light emitting diode (LED).

10. The aircraft light source of claim 1, comprising a limiting resistor disposed on the second substrate and coupled in series with the array of electromagnetic energy emitters, and wherein the sum of the forward bias voltage drops of the array of electromagnetic energy emitters is operative to reduce the voltage drop across the limiting resistor.

11. The aircraft light source of claim 1, comprising a rectifier disposed on the second substrate to convert alternating current received from the aircraft electrical power system to direct current suitable for powering the array of electromagnetic energy emitters.

12. An aircraft light source, comprising:
a substrate;
an array of series connected electromagnetic energy emitters disposed on the substrate, the array comprising at least a first and a second electromagnetic energy emitters, the first and second electromagnetic energy emitters comprising a cathode and an anode, wherein the anode of the first electromagnetic energy emitter is configured to couple to an aircraft electrical power system, wherein the cathode of the first electromagnetic energy emitter is configured to couple to the anode of the second electromagnetic energy emitter, wherein each of the at least first and second electromagnetic energy emitters have a specified forward bias voltage drop, wherein a sum of the forward bias voltage drops reduces a current drawn by the array to produce a specific uniform predetermined spectral output and a thermal signature substantially similar to an incandescent lamp in an aircraft illumination system, wherein the light source is a direct drop-in replacement for the incandescent lamp, and wherein the light source requires substantially no thermal transfer, the electromagnetic energy emitters configured to radiate electromagnetic energy at one or more than one predetermined wavelength; and
a housing having a first end configured to couple to a lens and a second end configured to couple to an electric socket suitable for the incandescent lamp in the aircraft illumination system, the housing defining an opening to receive the substrate.

13. The aircraft light source of claim 12, comprising a lens coupled to the first end of the housing.

14. The aircraft light source of claim 13, wherein the lens comprises a plurality of projecting members and wherein the first end of the housing comprises a plurality of slots to receive the respective projecting members.

15. The aircraft light source of claim 13, wherein the lens comprises one or more phosphors to absorb at least some of the energy emitted by the electromagnetic energy emitters.

16. The aircraft light source of claim 12, comprising an electrical contact formed on the second end of the housing adapted to couple to an aircraft electrical power system.

17. The aircraft light source of claim 12, wherein each of the electromagnetic energy emitters are configured to radiate electromagnetic energy at a different wavelength.

18. The aircraft light source of claim 12, wherein at least one of the electromagnetic energy emitters comprises at least one light emitting element.

19. The aircraft light source of claim 18, wherein the at least one light emitting element comprises a light emitting diode (LED).

20. The aircraft light source of claim 12, comprising a limiting resistor disposed on the second substrate and coupled in series with the array of electromagnetic energy emitters, and wherein the sum of the forward bias voltage drops of the array of electromagnetic energy emitters is operative to reduce the voltage drop across the limiting resistor.

21. The aircraft light source of claim 12, comprising a rectifier disposed on the second substrate to convert alternating current received from the aircraft electrical power system to direct current suitable for powering the array of electromagnetic energy emitters.

22. An aircraft cockpit display, comprising:
an electric socket adapted and configured to receive an incandescent lamp; and
an aircraft light source coupled to the electric socket, the aircraft light source comprising:
a substrate;
an array of series connected electromagnetic energy emitters disposed on the substrate, the array comprising at least a first and a second electromagnetic energy emitters, the first and second electromagnetic energy emitters comprising a cathode and an anode, wherein the anode of the first electromagnetic energy emitter is configured to couple to an aircraft electrical power system, wherein the cathode of the first electromagnetic energy emitter is configured to couple to the anode of the second electromagnetic energy emitter, wherein each of the at least first and second electromagnetic energy emitters have a specified forward bias voltage drop, wherein a sum of the forward bias voltage drops reduces a current drawn by the array to produce a specific uniform predetermined spectral output and a thermal signature substantially similar to an incandescent lamp in an aircraft illumination system, wherein the light source is a direct drop-in replacement for the incandescent lamp, and wherein the light source requires substantially no thermal transfer, the electromagnetic energy emitters configured to radiate electromagnetic energy at a predetermined wavelength; and
a housing having a first end configured to couple to a lens and a second end configured to couple to an electric socket suitable for an incandescent lamp in an aircraft illumination system, the housing defining an opening to receive the substrate.

23. The aircraft cockpit display of claim 22, comprising an aircraft electrical power system coupled to the electric socket.

* * * * *